(12) United States Patent
Tsuji

(10) Patent No.: US 7,046,456 B2
(45) Date of Patent: May 16, 2006

(54) LENS APPARATUS AND CAMERA

(75) Inventor: Kanji Tsuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/000,988

(22) Filed: Dec. 2, 2004

(65) Prior Publication Data

US 2005/0128602 A1    Jun. 16, 2005

(30) Foreign Application Priority Data

Dec. 12, 2003    (JP)    ............... 2003-415792

(51) Int. Cl.
*G02B 15/14* (2006.01)
*G02B 7/02* (2006.01)

(52) U.S. Cl. ............... 359/699; 359/694; 359/823

(58) Field of Classification Search ............... 359/694, 359/699, 819, 821–823; 396/82, 84
See application file for complete search history.

(56) References Cited

U.S. PATENT DOCUMENTS 6,002,531 A * 12/1999 Nakashima et al. ........ 359/700
6,008,954 A * 12/1999 Shintani et al. ............ 359/704
6,278,844 B1    8/2001 Takeshita .................... 396/85

FOREIGN PATENT DOCUMENTS

| JP | 2000-194045 | 7/2000 |
| JP | 3297658 B2 | 7/2002 |

* cited by examiner

*Primary Examiner*—Ricky Mack
*Assistant Examiner*—M. Hasan
(74) *Attorney, Agent, or Firm*—Fitzpatrick, Cella, Harper & Scinto

(57) ABSTRACT

A lens apparatus is disclosed which allows a reduced overall length when it is put into a barrel body while a high magnification of taken images is realized. The lens apparatus includes a first holding member which holds a first lens unit; a second holding member which holds a second lens unit disposed closer to an image plane side than the first lens unit; a first cam member which has a first cam portion driving the first holding member in an optical axis direction; a second cam member which has a second cam portion driving the first cam member in the optical axis direction; and a third cam member which includes a third cam portion driving the second holding member in the optical axis direction.

7 Claims, 11 Drawing Sheets

LENS APPARATUS AND CAMERA

BACKGROUND OF THE INVENTION

1. Field of the Invention

The present invention relates to a lens apparatus which can be extended outward in an optical axis direction to perform zoom operation and can be put into a barrel body, and to a camera which has the lens apparatus.

2. Description of Related Art

A conventional camera which has a solid-state image-pickup element and a collapsible lens apparatus with a magnification of approximately two to three times is formed such that a first lens unit closer to an object side is largely moved in an optical axis direction in a WIDE state to provide large spacing between the first lens unit and a second lens unit closer to an image side than the first lens unit. During zooming from the WIDE state to a TELE state, the first lens unit is moved along a convex trajectory toward the image side and the second lens unit is largely moved toward the object side from the WIDE position to reduce the spacing between the first lens unit and the second lens unit.

Such a camera is formed such that the first lens unit and the second lens unit are put (they are collapsed) into a camera body when no image is taken. The camera is disclosed in Japanese Patent No. 3297658.

To achieve the collapsing operation and variable magnification operation of the lens apparatus as described above, barrel members in two stages are used in which the first lens unit is held by the barrel member in the first (foremost) stage and the second lens unit is held by the barrel member in the second stage having a cam. Cams are provided to drive the first lens unit and the second lens unit in response to the collapsing operation and the variable magnification operation of the lens apparatus.

However, when the aforementioned conventional structure is used in a zoom lens apparatus which realizes a change in focal length at a high magnification of three times or more, the moving amount of the first lens unit is increased in a WIDE mode to further increase the spacing between the first lens unit and the second lens unit in the WIDE mode. On the other hand, in a TELE mode, the spacing between the first lens unit and the second lens unit is reduced to the same level as in the aforementioned conventional lens apparatus.

For this reason, when the lens apparatus has barrel members in two stages and the second stage is provided with a cam for driving the first lens unit and the second lens unit to perform the collapsing operation and variable magnification operation as in the conventional lens apparatus, the spacing between the first and second lens units when the lens is collapsed is largely different from the spacing when the variable magnification operation is performed (in the WXDE state). The overall length of the barrel member in the second stage is thus increased in the optical axis direction in order to ensure the moving amounts of the first and second lens units. This presents a problem that the collapsed lens apparatus cannot be put compactly into a camera body to result in an increased size of the camera.

SUMMARY OF THE INVENTION

According to one aspect, the present invention provides a lens apparatus having a first holding member which holds a first lens unit; a second holding member which holds a second lens unit disposed closer to an image plane side than the first lens unit; a first cam member which includes a first cam portion driving the first holding member in an optical axis direction; a second cam member which includes a second cam portion driving the first cam member in the optical axis direction; and a third cam member which includes a third cam portion driving the second holding member in the optical axis direction.

Here the lens apparatus can perform zoom operation in a state where the lens apparatus protrudes from a main body and perform housing operation in which the lens apparatus is housed into the main body, the first and second cam portions have shapes for moving the first holding member along a trajectory which is convex toward one side of the optical axis direction, and the third cam portion has a shape for moving the second holding member in the optical axis direction without inversion during the zoom operation in one direction.

According to one aspect, the present invention provides a camera having the lens apparatus described above, and an image-pickup element which photoelectrically converts a luminous flux from the lens apparatus.

These and other characteristics of the lens apparatus and the camera of the present invention will be apparent from the following description of a specific embodiment with reference to the drawings.

DETAILED DESCRIPTION OF THE PREFERRED EMBODIMENTS

Embodiment 1

A lens apparatus which is Embodiment 1 of the present invention is described with reference to FIGS. 1 to 11.

Figure 1:
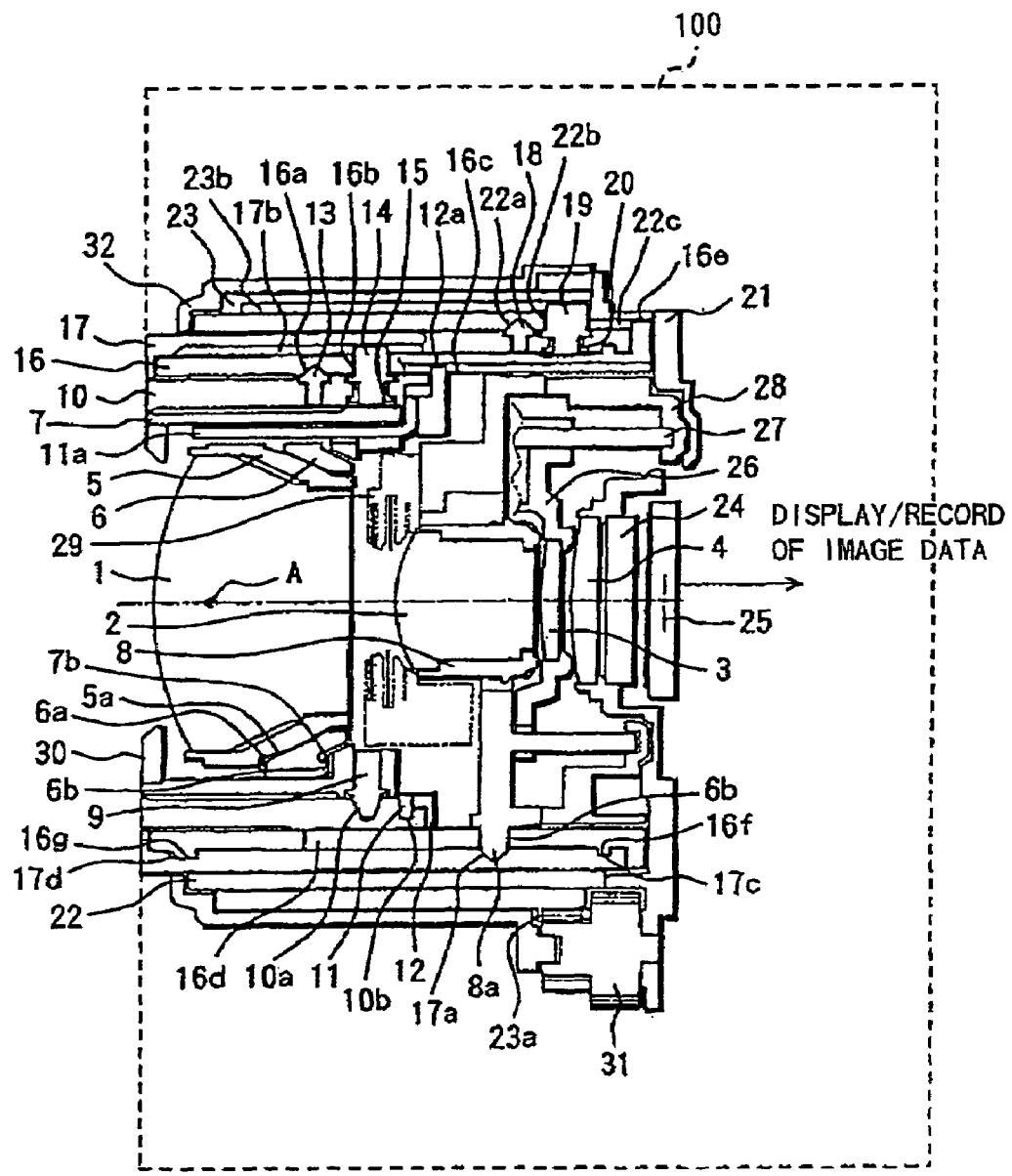
FIG. 1 is a section view of a lens apparatus which is collapsed in Embodiment 1 of the present invention.
Figure 2:
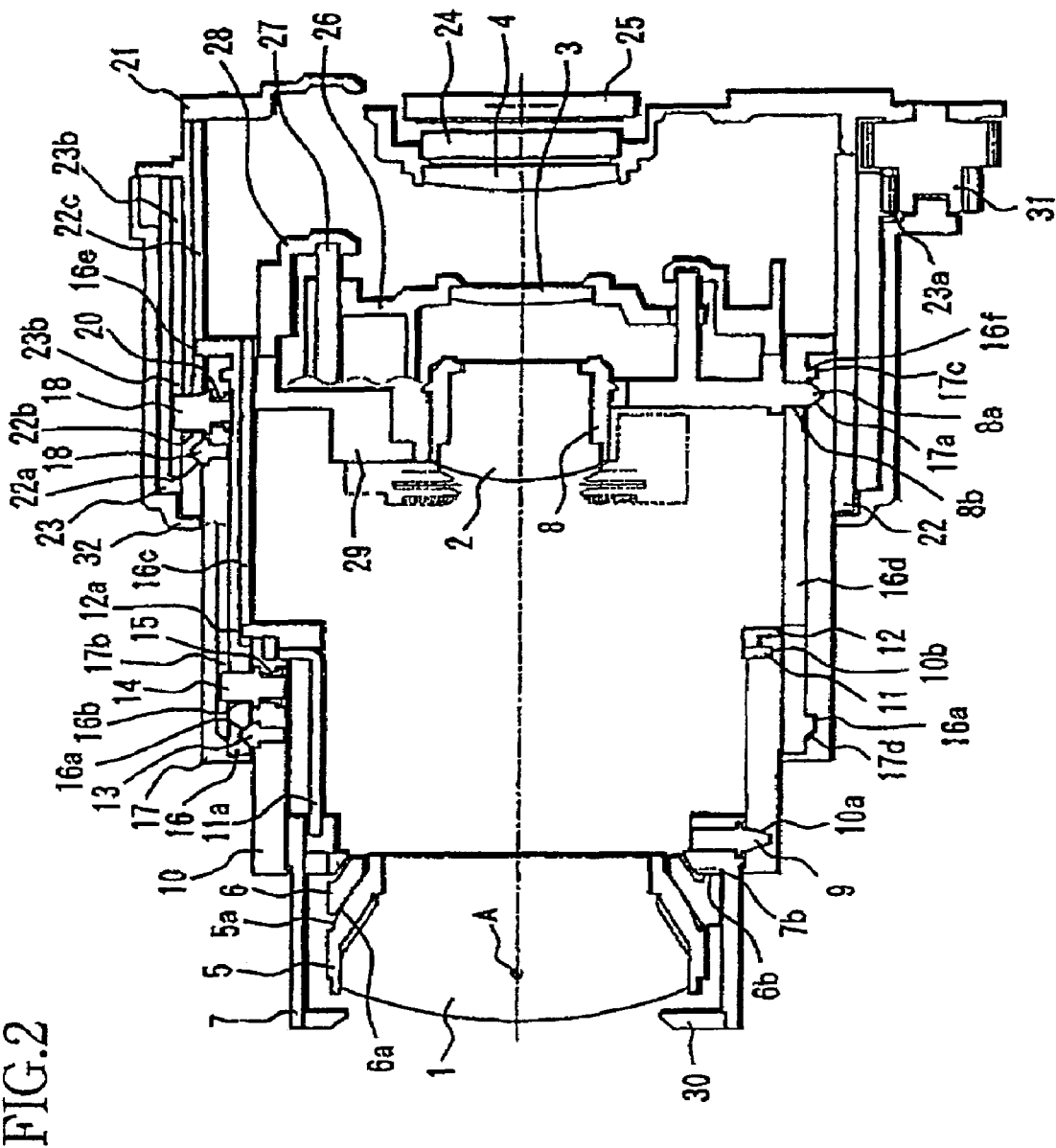
FIG. 2 is a section view of the lens apparatus in a WIDE state.
Figure 3:
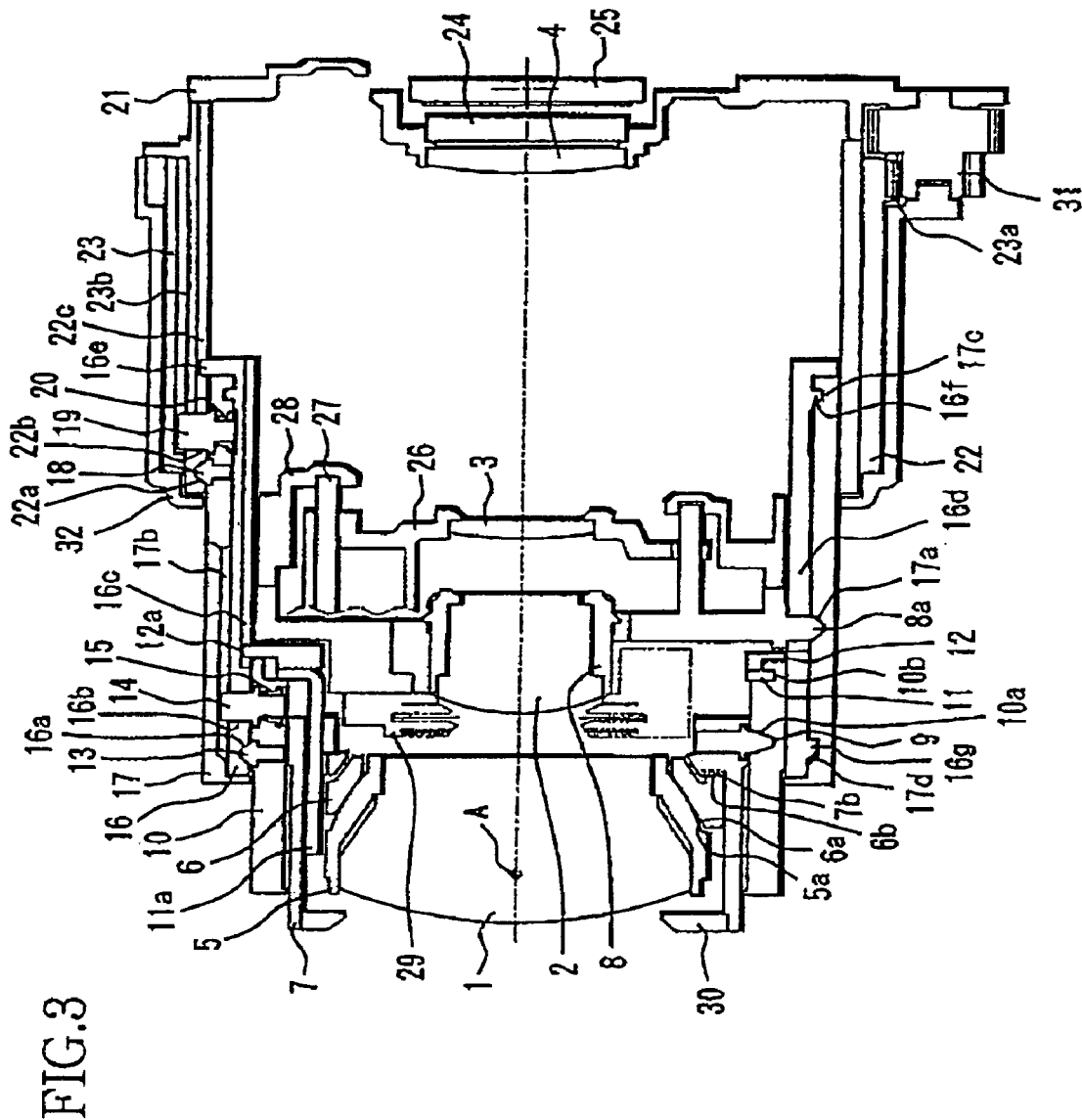
FIG. 3 is a section view of the lens apparatus in a TELE state.
Figure 4:
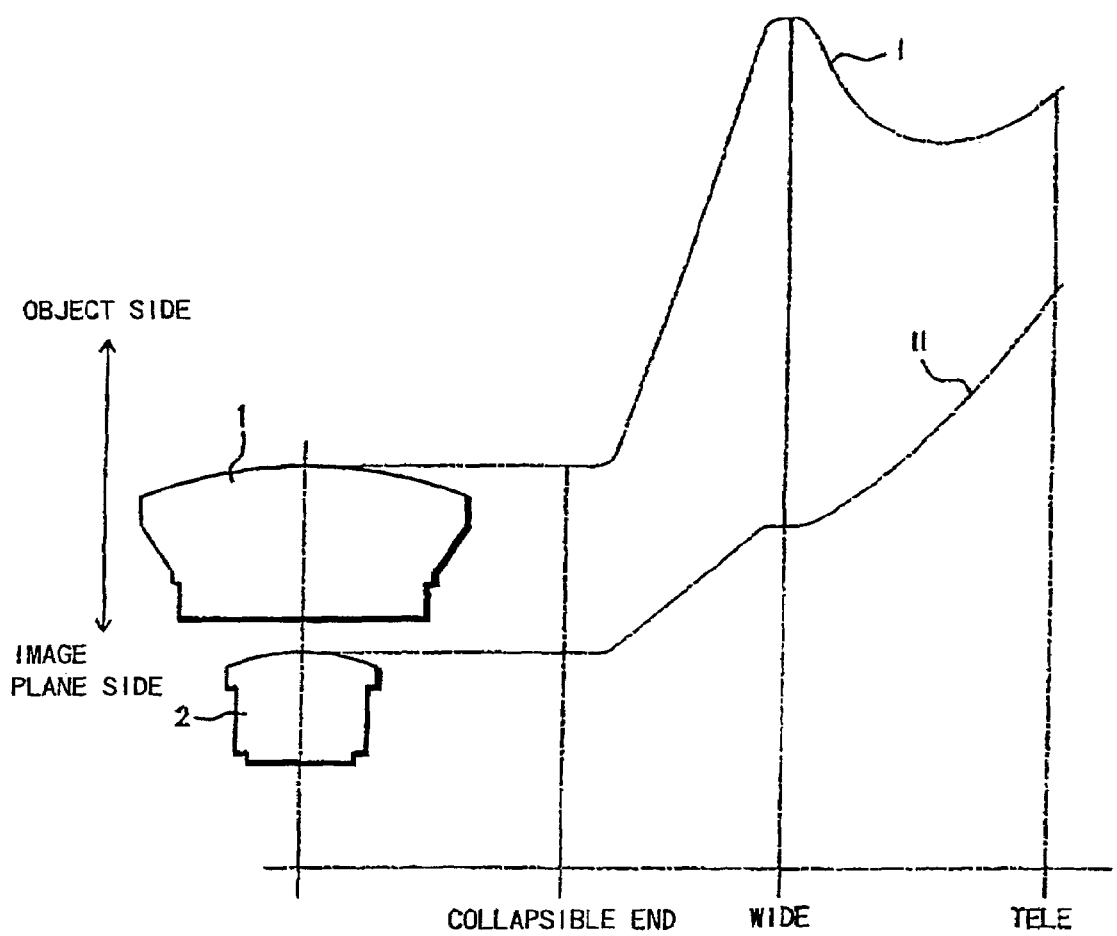
FIG. 4 shows the moving trajectories of a first lens unit and a second lens unit.

FIG. 1 is a section view of the lens apparatus which is collapsed. A dotted line in FIG. 1 shows the outline of a camera body 100 on which the lens apparatus is mounted. FIGS. 2 and 3 are section views of the lens apparatus in a WIDE state and a TELE state. FIG. 4 shows the moving trajectories of a first lens unit and a second lens unit.

Figure 5:
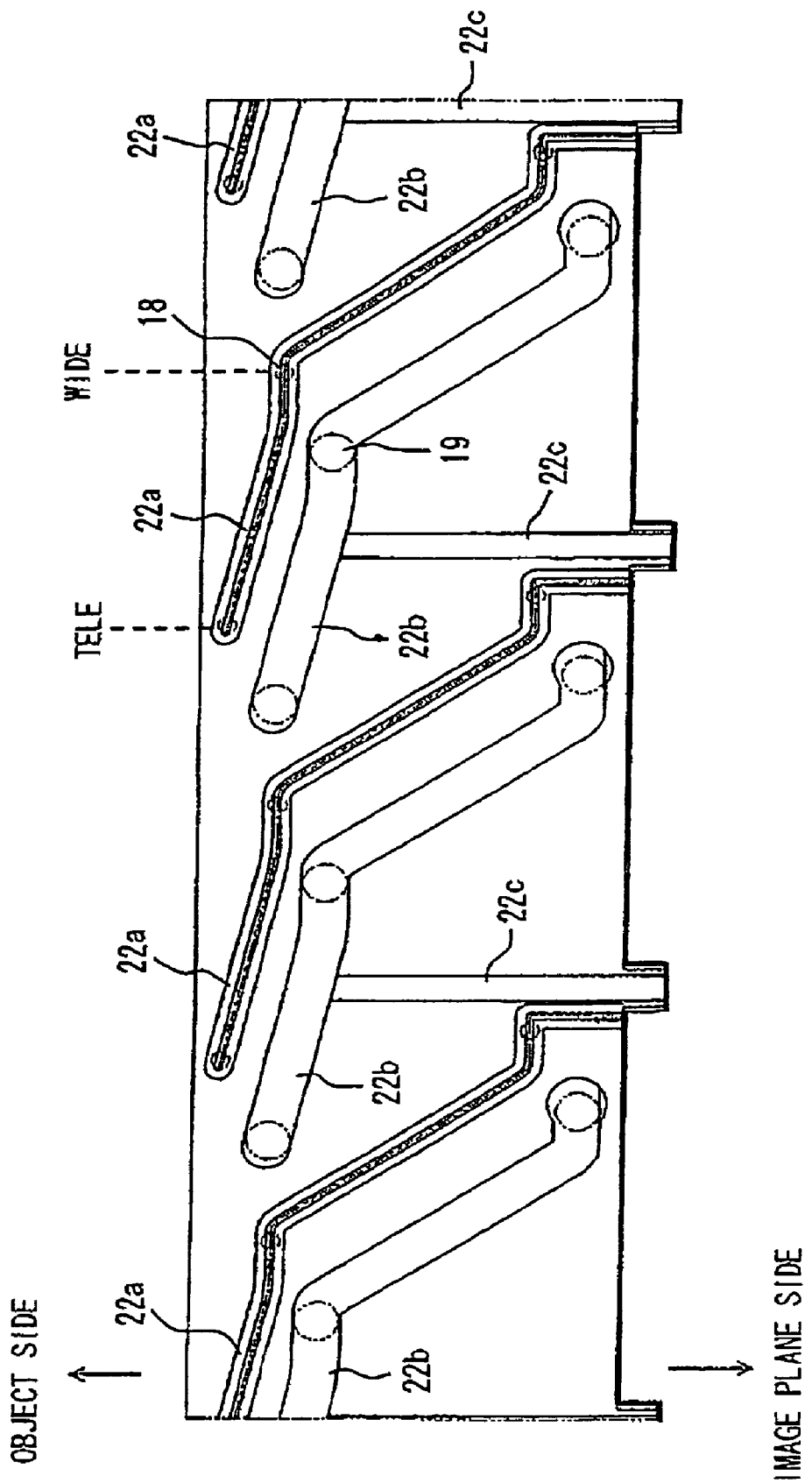
FIG. 5 is a development of a fixed barrel showing the inner surface thereof.
Figure 6:
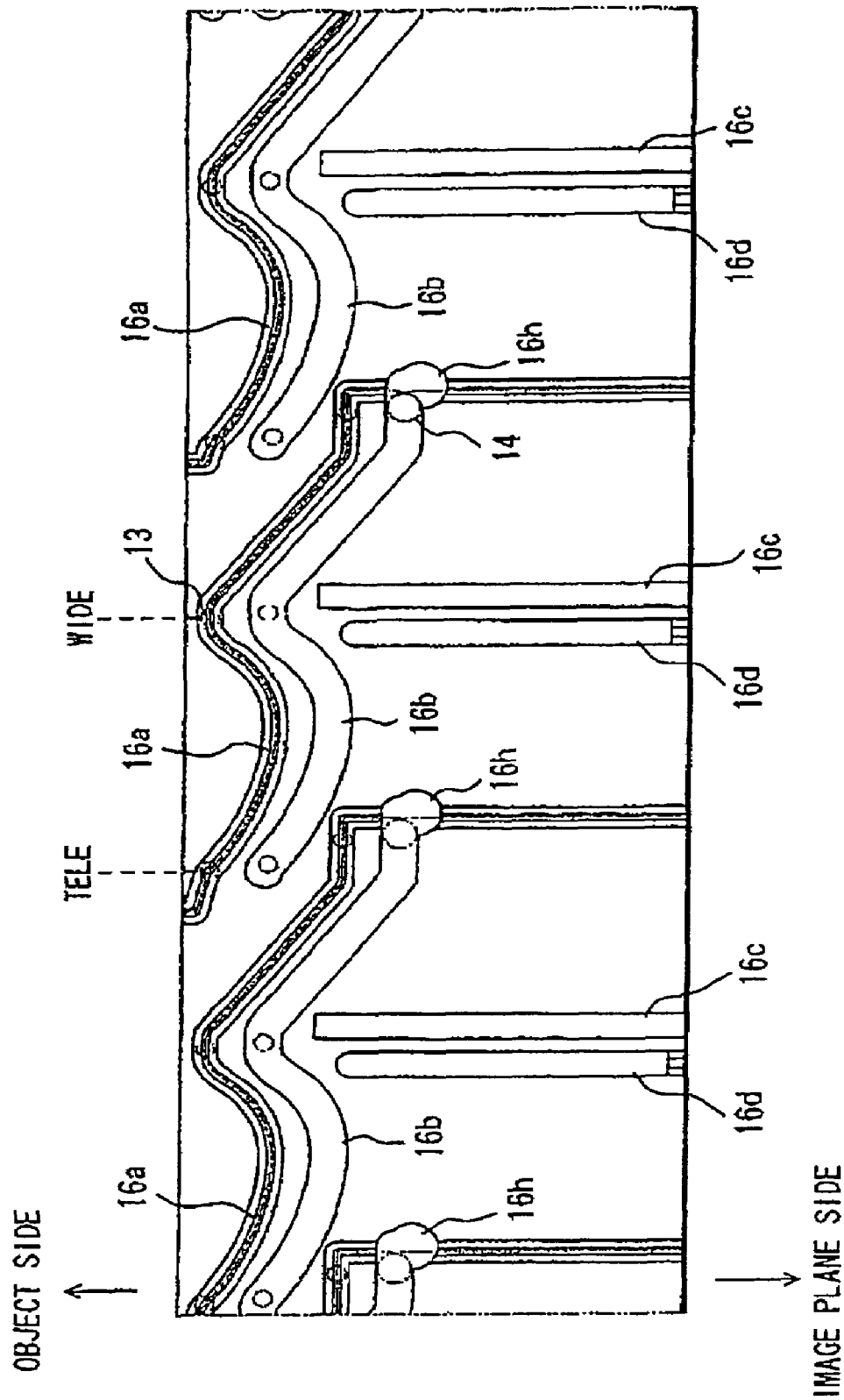
FIG. 6 is a development of a second cam barrel showing the inner surface thereof.
Figure 7:
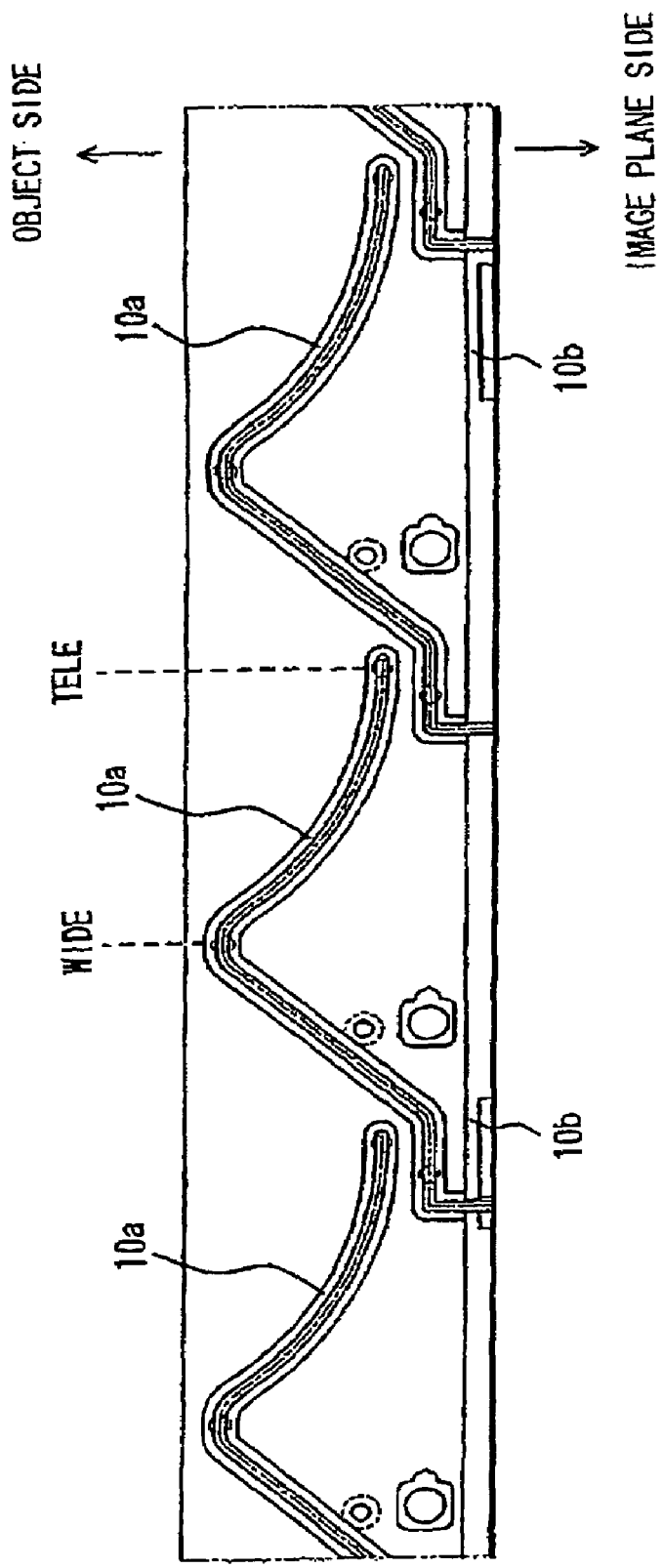
FIG. 7 is a development of a first cam barrel showing the inner surface thereof.
Figure 8:
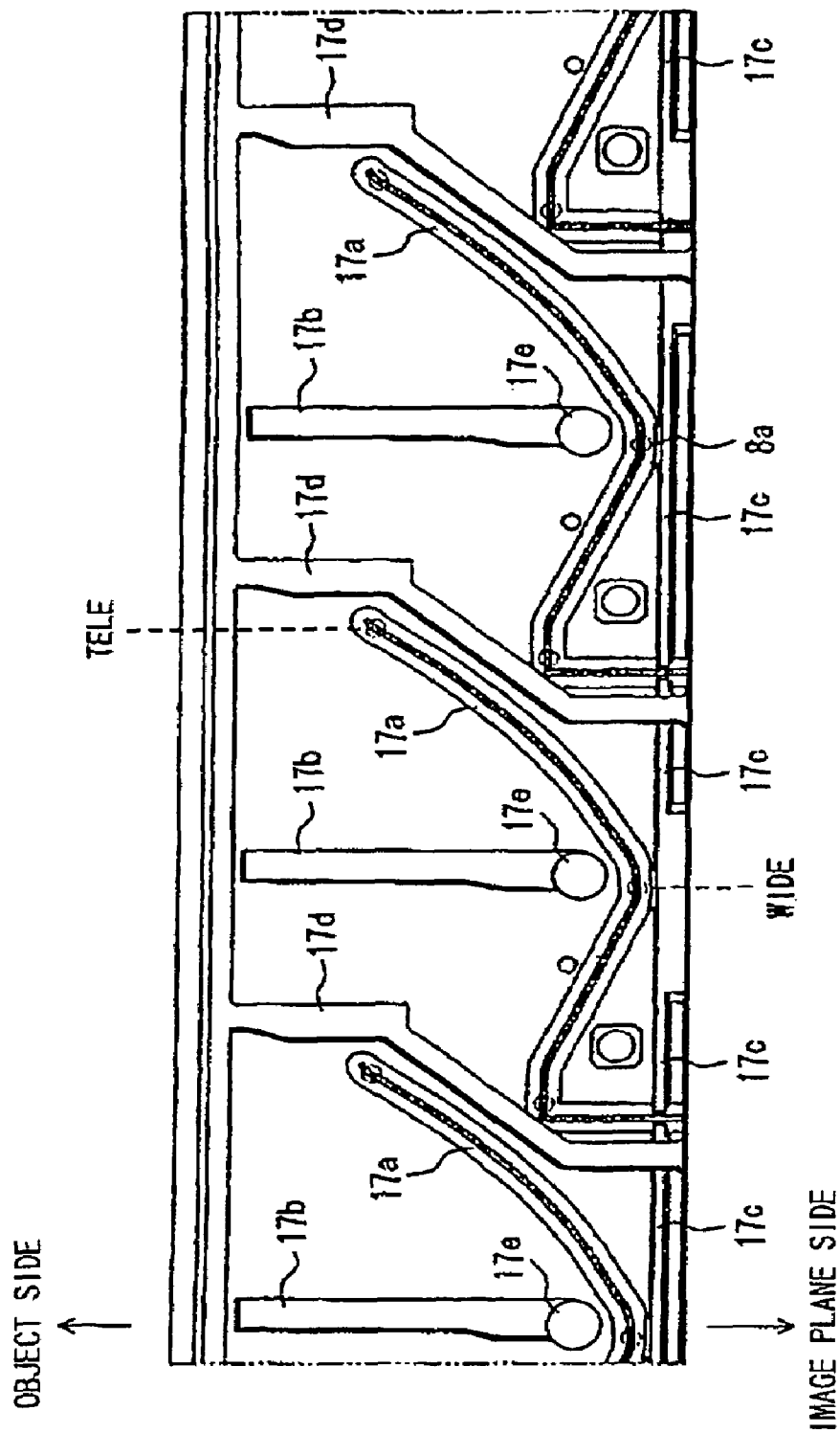
FIG. 8 is a development of a third cam barrel showing the inner surface thereof.
Figure 9:
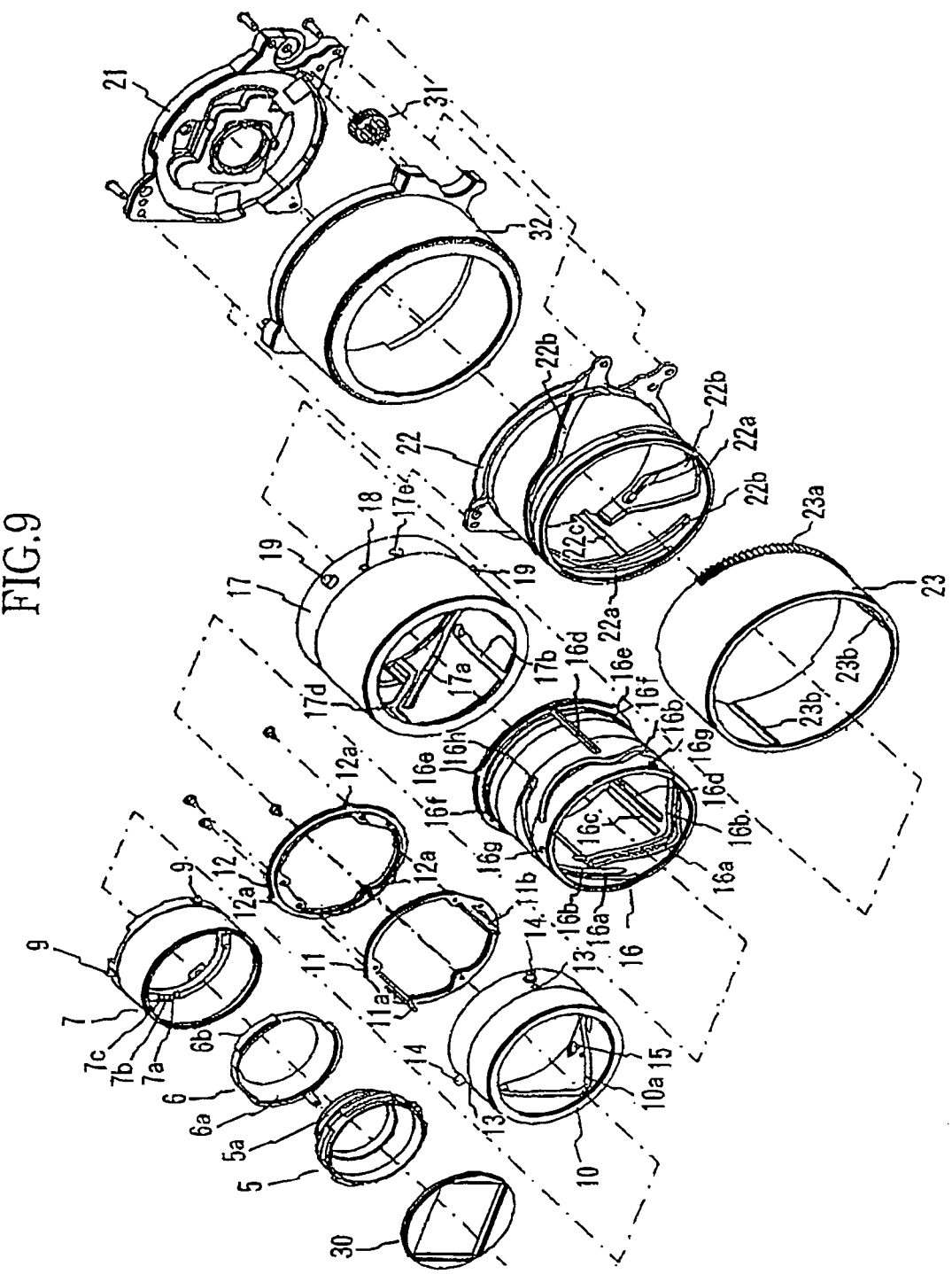
FIG. 9 is a perspective exploded view of the lens apparatus of Embodiment 1.
Figure 10:
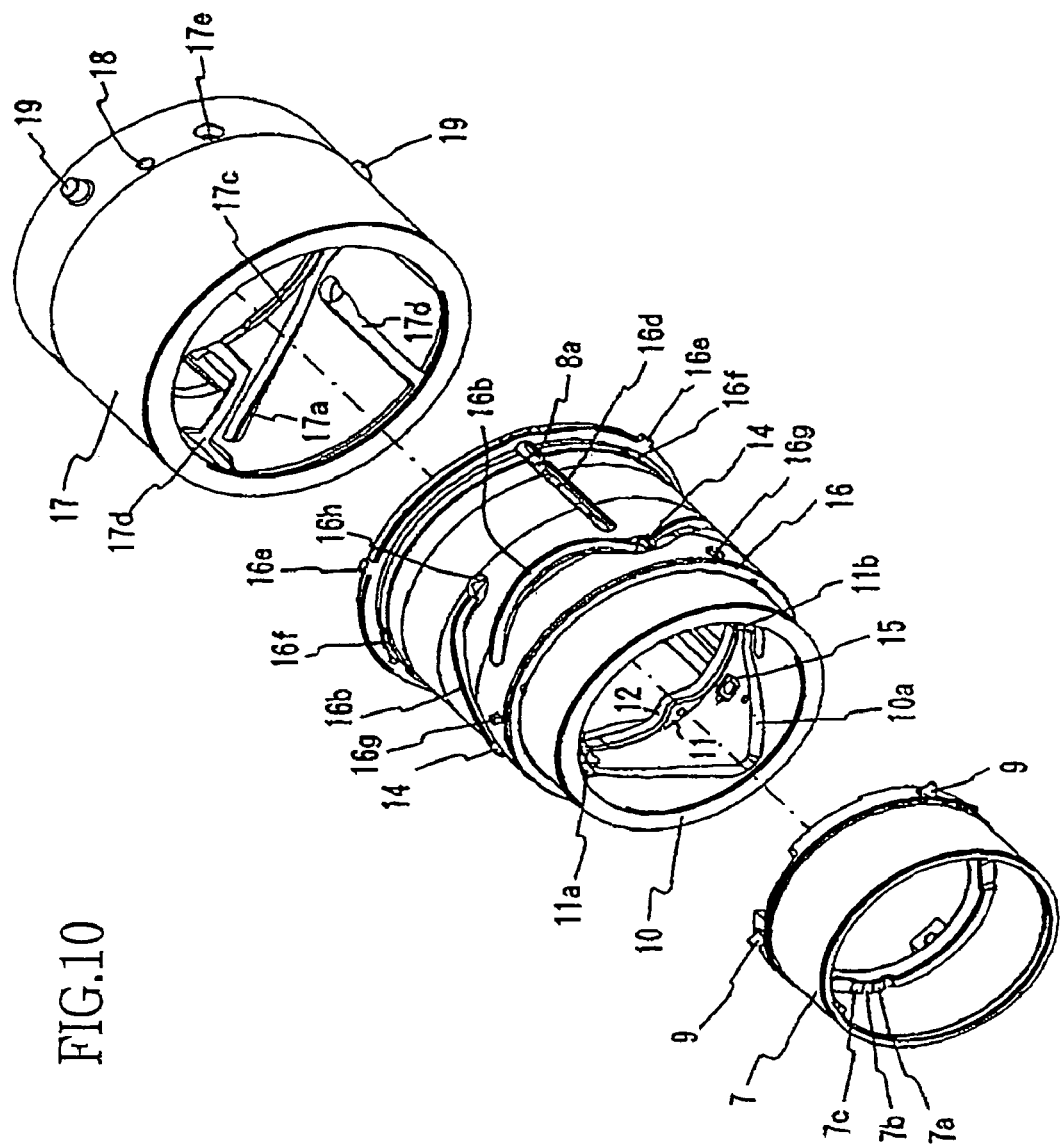
FIG. 10 is a perspective view showing the outer appearance of some components in the lens apparatus of Embodiment 1.
Figure 11:
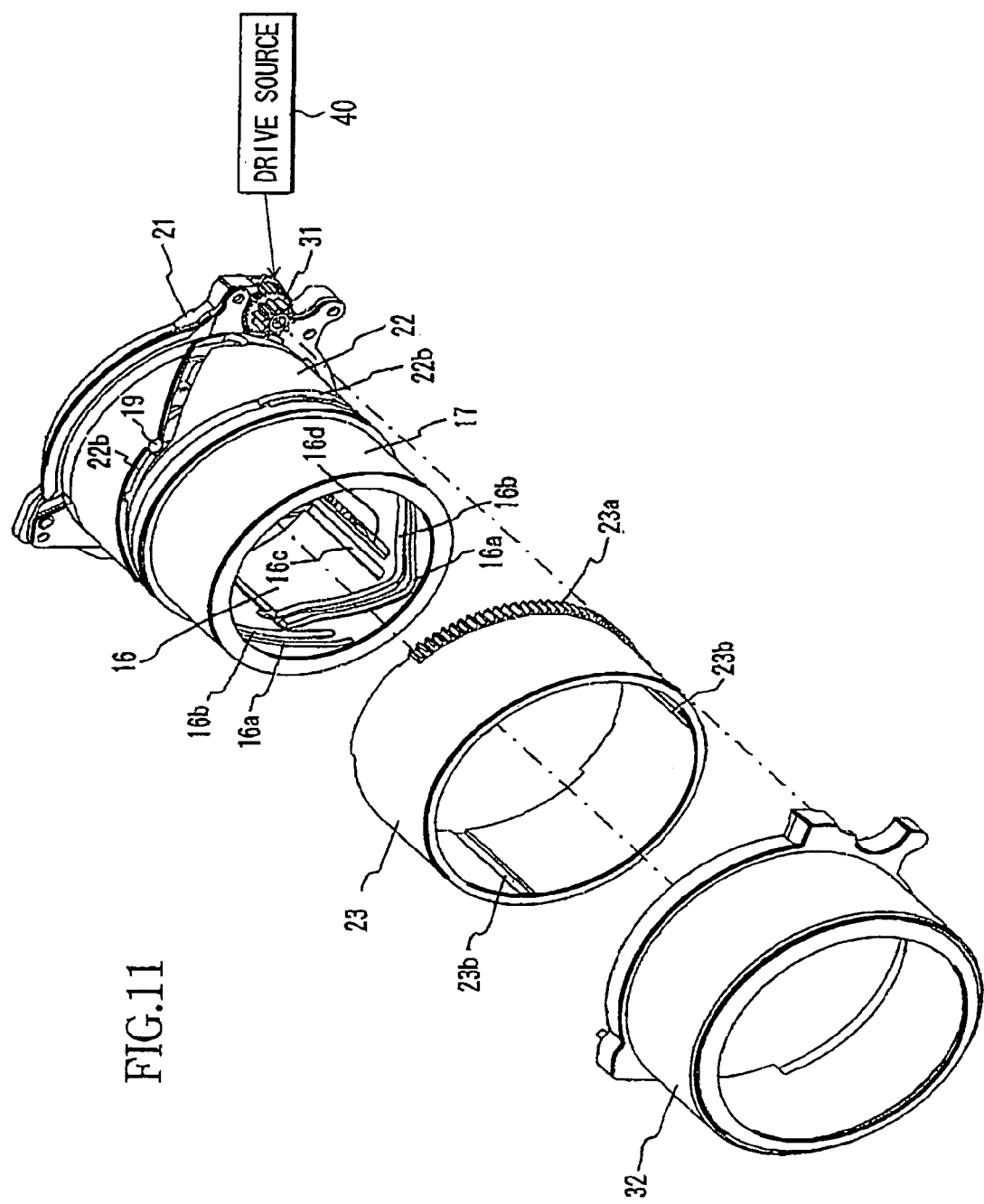
FIG. 11 is a perspective view showing the outer appearance of some components in the lens apparatus of Embodiment 1.

FIG. 5 is a development of a fixed barrel showing the inner surface thereof, FIG. 6 is a development of a second cam barrel showing the inner surface thereof, FIG. 7 is a development of a first cam barrel showing the inner surface thereof, and FIG. 8 is a development of a third cam barrel showing the inner surface thereof. FIG. 9 is a perspective exploded view of the lens apparatus of Embodiment 1. FIGS. 10 and 11 are perspective views showing the outer appearance of some components in the lens apparatus of Embodiment 1.

In those figures, reference numeral 1 shows the first lens unit positioned closest to an object side, 2 shows the second lens unit positioned closer to an image side than the first lens unit 1, 3 shows a third lens unit positioned closer to the image side than the second lens unit 2, and 4 shows a fourth lens unit positioned closer to the image side than the third lens unit 3.

Reference numeral 5 shows a first lens holder which holds the first lens unit 1 and has an R-shaped portion 5a forming part of a spherical surface centered at a rear principal point A of the first lens unit 1. Reference numeral 6 shows a first moving member which is movable in an optical axis direction, holds the first lens holder 5, and has an outer circumferential surface fitted to the inner circumferential surface of a first holding member 7, later described. The first moving member 6 has a conical portion 6a which has a diameter reduced toward the image side and abuts on the R-shaped portion 5a.

Reference numeral 7 shows the first holding member which holds the first moving member 6 and has, on its inner circumferential surface, stepped portions 7a, 7b, and 7c having surfaces at different positions in the optical axis direction. An R-shaped portion 6b formed on the first moving member 6 is formed to abut on one of the stepped portions 7a, 7b, and 7c.

The R-shaped portion 6b and the stepped portions 7a, 7b, and 7c are provided for each of three angular ranges of 120 degrees in a circumferential direction of the first moving member 6 and the first holding member 7, respectively.

The first lens holder 5 and the first holding member 7 are bounded and fixed to each other while the first moving member 6 and the first lens holder 5 are placed within the first holding member 7.

Reference numeral 8 shows a second lens holder which holds the second lens unit 2, 9 shows a first cam follower which is pressed and fixed to the outer periphery of the first holding member 7, and 10 shows a first cam barrel (a first cam member) which has, on its inner surface, a cam groove portion (a first cam portion) 10a which engages with the first cam follower 9.

Reference numeral 11 shows a guide member which has straight guide portions 11a and 11b for guiding the first holding member 7 in the optical axis direction and engages with a groove portion 10b for preventing the first cam barrel 10 from coming off. Reference numeral 12 shows a ring member which is fixed to the guide member 11 by screws and has, on its outer periphery, a protrusion 12a which extends outward in the diameter direction of the ring member 12.

The protrusion 12a engages with a straight guide groove portion 16c formed on the inner circumferential surface of a second cam barrel 16, later described, and extending in the optical axis direction, thereby allowing the ring member 12 to be moved only in the optical axis direction without rotation about the optical axis.

The guide member 11 and the ring member 12 can be fitted into the groove portion 10b (see FIG. 7) of the first cam barrel 10 in a predetermined position. When they are fitted thereinto, they can be rotated about the optical axis relative to the first cam barrel 10 and can be moved integrally in the optical axis direction.

Reference numeral 13 shows a cam follower which is formed on the outer periphery of the first cam barrel 10. Reference numeral 14 shows a pin shaped member (pin member) which is attached on the outer periphery of the first cam barrel 10 and engages with a straight groove portion 17b formed on the inner circumferential surface of a third cam barrel 17 in a later stage and extending in the optical axis direction to receive drive force from the straight groove portion 17b.

Reference numeral 15 shows a nut member for fixing the pin member 14 to the first cam barrel 10. Reference numeral 16 shows the second cam barrel (a second cam member) which has a cam groove portion (a second cam portion) 16a engaging with the cam follower 13, a cam hole portion 16b through which the pin member 14 passes and which has the same cam trajectory as the cam groove portion 16a, and a straight guide groove portion 16c engaging with the projection 12a of the ring member 12 to prevent rotation of the ring member 12 about the optical axis and to guide the ring member 12 in the optical axis direction, as shown in FIG. 6.

The second cam barrel 16 also has a straight guide portion 16d which engages with a rotation regulating portion 8b of the second lens holder 8 to guide the second lens holder 8 in the optical axis direction, a protrusion 16e which engages with a straight guide groove portion 22c of a fixed barrel 22, later described, and a protrusion 16f which extends in the circumferential direction of the second cam barrel 16 and engages with a groove portion 17c of the third cam barrel 17, later described.

The second cam barrel 16 also has a protrusion 16g which, when any force is applied thereto from outside of the lens apparatus, abuts on a groove portion 17d of the third cam barrel 17 to receive the outside force, and a through-hole portion 16h for receiving the pin member 14.

Reference numeral 17 shows the third cam barrel (a third cam member) which has, as shown in FIG. 8, a cam groove portion (a third cam portion) 17a engaging with a cam follower portion 8a integral with the second lens holder 8, and a straight grove portion 17b engaging with the pin member 14 to transmit rotation force about the optical axis. And the third cam barrel 17 also has a groove portion 17c allowing the protrusion 16f of the second cam barrel 16 to be fitted in a predetermined position and engaging with the protrusion 16f to prevent the second cam barrel 16 from coming off from the third cam barrel 17, a groove portion 17d in association with the protrusion 16g, and a through-hole portion 17e for receiving a pin member 19, later described.

Reference numeral 18 shows a cam follower which is pressed and fixed to the third cam barrel 17, and 19 shows the pin member which is attached to the third cam barrel 17 and engages with a straight groove 23b of a rotation barrel 23, later described, to receive rotation force about the optical axis. Reference numeral 20 shows a nut member for fixing the pin member 19 to the third cam barrel 17.

Reference numeral 21 shows a base member which is mounted on the camera body 100 and holds the fourth lens unit 4. Reference numeral 22 shows the fixed barrel (a fourth cam member) which is mounted on and fixed to the base member 21. As shown in FIG. 5, the fixed barrel 22 has a cam groove (a fourth cam portion) 22a which engages with the cam follower 18, a cam hole portion 22b which engages with the pin member 19 and has the same trajectory as the cam groove portion 22a, and a straight groove portion 22c which engages with the protrusion 16c of the second cam barrel 16 to prevent rotation of the second cam barrel 16 about the optical axis and to guide the second cam barrel 16 in the optical axis direction.

Reference numeral 23 shows the rotation barrel which has a gear portion 23a formed on its outer circumference and the straight groove portion 23b formed on its inner surface to transmit rotation force about the optical axis to the pin member 19. The rotation barrel 23 can be rotated about the optical axis by receiving drive force from a drive source, not shown.

Reference numeral 24 shows an optical member (for example, a low pass filter) which is fitted into the base member 21 and is positioned in front of an image-pickup element 25. Reference numeral 25 shows the image-pickup element such as a CCD sensor and a CMOS sensor which is mounted on the base member 21 in a manner, not shown. The image-pickup element 25 photoelectrically converts an optical image formed by the lenses 1 to 4 into an electric signal and outputs accumulated electric charge. An output signal from the image-pickup element 25 is subjected to predetermined signal processing in a signal processing circuit, not shown, provided in the camera body, and then the processed signal is displayed as a taken image on a display section (not shown), or recorded on a recording medium (not shown).

Reference numeral 26 shows a third holding member which holds the third lens unit 3, and 27 shows a third guide member for guiding the third holding member 26 in the optical axis direction.

Reference numeral 28 shows a fixing member for positioning and fixing the third guide member 27, and 29 shows a stop shutter unit which is mounted on the second holding member 8. The stop shutter unit 29 adjusts an amount of light incident on an image plane by changing the area of an opening at a light passing port and adjusts the amount of light incident on the image plane by opening and closing a fixed opening formed in the unit 29.

Reference numeral 30 shows a first cap member which is attached to the first holding member 7, and 31 shows a gear member which engages with the gear portion 23a of the rotation barrel 23 and is coupled to a power transmission mechanism for transmitting drive force from a drive source 40. Thus, the drive force from a drive source, not shown, is transmitted to the rotation barrel 23 which is rotated about the optical axis. Reference numeral 32 shows a cover member which is attached integrally to the base member 21 and the fixed barrel 22 by screws.

FIG. 4 shows the moving trajectories of the first lens unit 1 and the second lens unit 2 in association with zooming of the lens apparatus. In FIG. 4, a chain line I shows the moving trajectory of the first lens unit 1, while a chain line II shows the moving trajectory of the second lens unit 2.

In the structure of the lens apparatus described above, description is made for switching between a collapsed state (FIG. 1), a WIDE state (FIG. 2), and a TELE state (FIG. 3) by outward/inward extension operation of the lens apparatus in the optical axis direction.

First, when drive force from a drive source, not shown, is transmitted to the gear portion 23a of the rotation barrel 23 through the gear member 31, the rotation barrel 23 is rotated about the optical axis. Since the pin member 19 of the third cam barrel 17 passes through the cam hole portion 22b of the fixed barrel 22 to engage with the straight groove portion 23b of the rotation barrel 23, the third cam barrel 17 is also rotated about the optical axis in response to the rotation of the rotation barrel 23 about the optical axis (see FIG. 11).

The cam follower 18 of the third cam barrel 17 engages with the non-linear cam groove portion 22a formed on the inner circumferential surface of the fixed barrel 22, so that the cam follower 18 is driven along the cam groove portion 22a in response to the rotation of the third cam barrel 17 about the optical axis. Thus, the third cam barrel 17 is moved in the optical axis direction while it is rotated about the optical axis relative to the fixed barrel 22.

The second cam barrel 16 is slidable about the optical axis relative to the third cam barrel 17 by the engagement of the protrusion 16f with the groove portion 17c and they are movable integrally in the optical axis direction in addition, the protrusion 16e engages with the straight guide groove portion 22c of the fixed barrel 22. Therefore, when the third cam barrel 17 is moved in the optical axis direction while rotated about the optical axis, the second cam barrel 16 is moved only in the optical axis direction in accordance with the movement of the third cam barrel 17. The second cam barrel 16 is not rotated about the optical axis.

The pin member 14 of the first cam barrel 10 passes through the cam hole portion 16b of the second cam barrel 16 to engage with the straight groove portion 17b of the third cam barrel 17. The first cam barrel 10 can thereby be rotated about the optical axis by receiving rotation force of the third cam barrel 17 about the optical axis. The cam follower 13 of the first cam barrel 10 engages with the cam groove portion 16a of the second cam barrel 16, so that the cam follower 13 is moved along the cam groove portion 16a by the rotation of the first cam barrel 10 about the optical axis. Thus, the first cam barrel 10 is moved in the optical axis direction while rotated about the optical axis relative to the second cam barrel 16 (see FIG. 10).

At this point, the guide member 11 and the ring member 12 fixed to each other by the screws are prevented from being rotated about the optical axis by the engagement of the straight groove portion 16c with the rotation regulating portion 12a. They are slidable about the optical axis relative to the first cam barrel 10 and they are movable integrally in the optical axis direction by the engagement of the ring member 12 with the groove portion 10b, so that they are moved only in the optical axis direction together with the first cam barrel 10.

Since the first cam follower 9 of the first holding member 7 engages with the cam groove portion 10a of the first cam barrel 10, the first cam follower 9 is moved along the cam groove portion 10a in response to the rotation of the first cam barrel 10 about the optical axis. At this point, the first holding member 7 is prevented from being rotated about the optical axis by the straight guide portions 11a and 11b of the guide member 11 extending in the optical axis direction, so that it is moved only in the optical axis direction.

With the aforementioned operation, the first holding member 7 (the first lens unit 1) is moved along the cam trajectory formed by combining the trajectories of the cam groove portion 22a, the cam groove portion 16a, and the cam groove portion 10a (shown as the line I in FIG. 4). The first lens unit 1 is moved among the housed position, the WIDE position, and the TELE position in accordance with that moving trajectory.

On the other hand, since the cam follower portion 8a of the second holding member 8 engages with the cam groove portion 17a of the third cam barrel 17, the cam follower portion 8a is moved along the cam groove portion 17a in response to the rotation of the third cam barrel 17 about the optical axis. At this point, the second holding member 8 is prevented from being rotated about the optical axis by the engagement of the straight groove portion 16d of the second cam barrel 16 with the rotation regulating portion 8b, so that the second holding member 8 is moved only in the optical axis direction.

With the aforementioned operation, the second holding member 8 (the second lens unit 2) is moved along the cam trajectory formed by combining the trajectories of the cam groove portion 22a and the cam groove portion 17a (shown as the line II in FIG. 4). The second lens unit 2 is moved among the housed position, the WIDE position, and the TELE position in accordance with that moving trajectory.

On the other hand, the third holding member 26 is movable together with the second holding member 8. And the third holding member 26 is movable in the optical axis direction relative to the second holding member 8 by receiving drive force from a drive source (not shown) attached to the second holding member 8. The third holding member 26 is thus moved by a predetermined amount in accordance with a zoom position.

As described above, the first holding member 7 (the first lens unit 1) follows the combined trajectory of the cam groove portion 22a of the fixed barrel 22, the cam groove portion 16a of the second cam barrel 16, and the cam groove portion 10a of the first cam barrel 10 to be moved toward the WIDE position from the collapsed position as shown in FIG. 4. From the WIDE position to the TELE position, the cam groove portion 10a of the first cam barrel 10 has a cam trajectory which extends simply toward the image plane side, that is, which does not change in direction or does not reverse the direction (see FIG. 7), and the cam groove portion 16a of the second cam barrel 16 for driving the first cam barrel 10 has a cam trajectory which extends back and forth in the optical axis direction, that is, which reverses the direction (see FIG. 6) The first lens unit is moved along the combined trajectory of both of the cam trajectories.

In addition, the second holding member 8 (the second lens unit 2) is moved along the trajectory of the cam groove portion 17a of the third cam barrel 17, so that the second holding member 8 can be largely moved outward in the optical axis direction without interference between the first cam barrel 10, the guide member 11, or the ring member 12, and the second holding member 8.

In this manner, it is possible to realize the TELE state (FIG. 3) in which the first lens unit 1 and the second lens unit 2 are placed with small spacing between them in the optical axis direction.

As a result, the length of the collapsed lens apparatus can be reduced even in a zoom optical system with a high magnification in which the spacing between the first lens unit 1 and the second lens unit 2 largely varies in the housed position, the WIDE position, and the TELE position as shown in FIG. 4.

According to the present invention, the first holding member can be largely moved in the optical axis direction by using the first and second com portions in combination even when the respective areas for forming the first and second cam portions are limited. Also, when the lens apparatus is put into the barrel body, the overall length of the lens apparatus is advantageously reduced since the sizes of the first and second cam members can be reduced by the limited areas for the first and second cam portions.

In addition, since the first holding member is moved to follow the trajectory which is convex toward the one side of the optical axis direction (object side or image side), the overall length of the lens apparatus in zoom operation can be changed as appropriate. The third cam member, which is different from the members for driving the first holding member, is used to drive the second holding member, thereby allowing the spacing between the first and second lens units to be changed as appropriate in the zoom operation.

The first cam portion has a shape for simply driving the first holding member in the optical axis direction over the entire range of zoom operation, and the second cam portion has a shape for driving the first cam member along the trajectory which is convex toward the one side of the optical axis direction over the entire range of zoom operation. This can realize an appropriate change in the overall length of the lens apparatus (the length in the optical axis direction) during the zoom operation.

For example, the first cam member can be formed to have the convex trajectory toward the image side to reduce the outward extension of the lens apparatus by the amount corresponding to the convex toward the image side. The overall length of the lens apparatus can thus be reduced during the zoom operation.

The third cam portion has a shape for simply driving the second holding member in the optical axis direction over the entire range of zoom operation, which enables the spacing between the first holding member and the second holding member to be changed largely in the optical axis direction.

The second cam member can be coupled to the fourth cam member which has the fourth cam portion formed thereon for drive it in the optical axis direction relative to the barrel body to further change the moving amount of the first holding member in the optical axis direction.

For example, the fourth cam portion has a shape for simply driving the second cam member in the optical axis direction over the entire range of zoom operation. This can further increase the drive amount of the first holding member in the optical axis direction to provide a higher zoom magnification.

While preferred embodiment has been described, it is to be understood that modification and variation of the present invention may be made without departing from the scope of the following claims.

"this application claims priority from Japanese patent application no. 2003-415792 filed on Dec. 12, 2003, which is hereby incorporated by reference herein."

What is claimed is:

1. A lens apparatus comprising:
    a first holding member which holds a first lens unit;
    a second holding member which holds a second lens unit disposed closer to an image plane side than the first lens unit;
    a first cam member which includes a first cam portion driving the first holding member in an optical axis direction;
    a second cam member which includes a second cam portion driving the first cam member in the optical axis direction; and
    a third cam member which includes a third cam portion driving the second holding member in the optical axis direction;
    wherein the lens apparatus can perform zoom operation in a state where the lens apparatus protrudes from a main body and perform housing operation in which the lens apparatus is housed into the main body,
    the first and second cam portions have shapes for moving the first holding member along a trajectory which is convex toward one side of the optical axis direction, and
    the third cam portion has a shape for moving the second holding member in the optical axis direction without inversion during the zoom operation in one direction.

2. The lens apparatus according to claim 1, wherein the first cam portion has a shape for moving the first holding member in the optical axis direction without inversion during the zoom operation in one direction, and the second cam portion has a shape for moving the first cam member along a trajectory which is convex toward one side of the optical axis direction during the zoom operation in one direction.

3. The lens apparatus according to claim 1, wherein the trajectory is convex toward the image plane side.

4. The lens apparatus according to claim 1, further comprising a fourth cam member which includes a fourth cam portion for moving the second cam member in the optical axis direction relative to the main body.

5. The lens apparatus according to claim 4, wherein the fourth cam portion has a shape for moving the second cam member in the optical axis direction without inversion during the zoom operation in one direction.

6. The lens apparatus according to claim 1, wherein the third cam member moves together with the second cam member in the optical axis direction.

7. A camera comprising:

the lens apparatus according to claim 1; and an image-pickup element which photoelectrically converts an optical image formed by the lens apparatus.

* * * * *

UNITED STATES PATENT AND TRADEMARK OFFICE
CERTIFICATE OF CORRECTION

PATENT NO.        : 7,046,456 B2           Page 1 of 1
APPLICATION NO. : 11/000988
DATED             : May 16, 2006
INVENTOR(S)       : Kanji Tsuji It is certified that error appears in the above-identified patent and that said Letters Patent is hereby corrected as shown below:

COLUMN 1
Line 53, "WXDE" should read --WIDE--.

COLUMN 6
Line 12, "direction in" should read --direction. In--.

COLUMN 7
Line 54, "com" should read --cam--.

COLUMN 8
Line 26, "drive" should read --driving--.
Line 35, "preferred" should read --a preferred--.

Signed and Sealed this

Twenty-sixth Day of December, 2006

JON W. DUDAS
*Director of the United States Patent and Trademark Office*